United States Patent
Fedyk et al.

(10) Patent No.: US 7,558,877 B1
(45) Date of Patent: Jul. 7, 2009

(54) SELF-CONFIGURING METHOD AND APPARATUS FOR PROVIDING SECURE COMMUNICATION BETWEEN MEMBERS OF A GROUP

(75) Inventors: Donald Fedyk, Groton, MA (US); Lakshminath Dondeti, Chelmsford, MA (US); Haixiang He, Woburn, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 876 days.

(21) Appl. No.: 10/661,734

(22) Filed: Sep. 12, 2003

(51) Int. Cl.
*G06F 15/16* (2006.01)
(52) U.S. Cl. .......................... 709/242; 726/15
(58) Field of Classification Search ................ 709/225, 709/227, 218, 242, 229, 238, 236, 246
See application file for complete search history.

(56) References Cited

U.S. PATENT DOCUMENTS

| | | | | |
|---|---|---|---|---|
| 6,891,793 | B1* | 5/2005 | Suzuki et al. ................ | 370/217 |
| 7,190,678 | B2* | 3/2007 | Thubert et al. ............... | 370/254 |
| 2003/0177221 | A1* | 9/2003 | Ould-Brahim et al. ...... | 709/223 |
| 2004/0006708 | A1* | 1/2004 | Mukherjee et al. .......... | 713/201 |
| 2004/0044891 | A1* | 3/2004 | Hanzlik et al. ............... | 713/150 |
| 2004/0044908 | A1* | 3/2004 | Markham et al. ............ | 713/201 |
| 2004/0049597 | A1* | 3/2004 | Ould-Brahim ............... | 709/242 |
| 2004/0081172 | A1* | 4/2004 | Ould-Brahim ......... | 370/395.53 |

OTHER PUBLICATIONS

Bates, T. and J. Hawkinson, "Guidelines for creation of an AS", RFC 1930, Mar. 1996.*
Ciglaric, M.; Pancur, M.; Trampus, M.; Vidmar, T., "Distributed message routing in unstructured P2P network overlays," EUROCON 2003. Computer as a Tool. The IEEE Region 8, vol. 2, Iss., Sep. 22-24, 2003 pp. 79-82 vol. 2.*
Wonjoo Park; Jaehoon Nah; SUngwon Sohn; Daeyoung Kim, "The group security association for secure multicasting", Networks, 2001. Proceedings. Ninth IEEE International Conference on Vol., Iss., Oct. 10-12, 2001 pp. 130-133.*
Herscovitz, E., "Secure virtual private networks: the future of data communications," International Journal of Network Management. vol. 9, Iss. 4, Aug. 1999 pp. 213-220.*
Hardjono et al., The Multicast Security Architecture, Internet-draft, May 2003, 19 pages.
Mark Baugher et al., Group Key Management Architecture, Internet-draft, Jun. 27, 2003, 34 pages.
E.Rosen et al., BGP/MPLS VPNs, The Internet Society, Mar. 1999, 24 pages.

* cited by examiner

*Primary Examiner*—Andrew Caldwell
*Assistant Examiner*—Jason Recek
(74) *Attorney, Agent, or Firm*—Anderson Gorecki & Manaras LLP (57) ABSTRACT

Each member of a group registers with the Security/Routing (S/R) device 30 and receives a Group Security Association (GSA) associated with the group. The member may register as part of a group by identifying the group and the other members. Alternatively, Routing Functionality auto-discovers the other members of the group. AS members are identified, Routing functionality reflects the routes of all members in the group to all other members of the group. The forwarding of the routes to the respective group members may be secured via the GSA associated with the group. Each member can forward communication directly to the group members, securing the communication using the group SA and standard tunneling techniques (such as IPsec, GRE, MPLS, etc.). Thus the S/R provides a mechanism for private networks to be built on top of an existing network without modification of any existing network components and much more scalable in operation and configuration than individual IP sec tunnels.

12 Claims, 5 Drawing Sheets

Figure 1

Prior Art

SELF-CONFIGURING METHOD AND APPARATUS FOR PROVIDING SECURE COMMUNICATION BETWEEN MEMBERS OF A GROUP

FIELD OF THE INVENTION

This invention is related generally to the field of networking and more specifically to a method and apparatus for providing secure communications in a networked environment.

BACKGROUND OF THE INVENTION

Typical corporations are comprised of many physically disjoint branches. Corporate networks seek to provide a seamless coupling between the branches so that a corporate user has access to the same data regardless of where the user connects in the physical network. Because the data travels between two physically disjoint sites, measures must be taken to ensure that the privacy of the data is maintained. Several solutions exist for establishing private connection between remote sites. The first solution is to provide dedicated connections between sites. However, dedicated connections require complex provisioning at each site, and thus may be very expensive. A second solution is to use a Virtual Private Network (VPN). In a VPN, network providers' resources (a 'backbone') are shared by many different customers. Each customer layers security mechanisms on top of the backbone to carve out their own portion of the network, thereby providing the appearance of a private network. Each member of the VPN stores forwarding and authentication information that enables communication with members of the VPN. The tables storing the forwarding information can get quite large as the network grows and point to point connection associated with each network device is recorded, and thus network scalability is an issue in VPN network design.

An additional problem with VPNs is that data that is transferred on VPNs may or may not be encrypted. If it is not encrypted, the opportunity is present for eavesdropping or data modification by other devices in the public network. To overcome the security concerns, IPsec (Internet Protocol Security Protocol) tunnels are generally used to maintain privacy in a VPN. IPsec provides per-packet authenticity/confidentiality guarantees between communicating sites. In general, a tunnel is created by allocating a key to each of a pair of communicating sites. Data transferred between the sites is encrypted and decrypted using the key. Because only the pair of sites has knowledge of the key, only those two devices can gain access to the data. To maintain a network that implements VPNs and IPsec tunneling, generally a table is maintained at each site, identifying the other sites participating in the VPN, and the keys that may be used to authenticate communication with these devices.

Thus, both VPNs and IPsec tunneling involve point to point connections between sites, and therefore require that data enabling the point to point connections be maintained at each site. As a result, for each of N connections in the network the amount of data stored to support such a network grows at a rate of $N^2-1$. In a network having a thousand endpoints, data may be stored identifying paths and authentication for the million connections between the endpoints, and the scalability of such a design rapidly becomes an issue.

To overcome the scalability issues associated with VPNs, Network based IP VPNs that allow the client sites to form routing peers with the service provider's network prevent the client sites from suffering the effects of point to point connections. There are several variants of Network based IP based VPNs introduced in the standards bodies which share common attributes that address the scalability of point to point connections. One such architecture has been provided that uses layer 3 (IP) technology to abstract the particulars of the routing from the physical network topology. This architecture is described in the Internet Engineering Task Force (IETF) Request For Comments (RFC) 2547, as "Border Gateway Protocol (BGP)/Multi-protocol Label Switch Protocol (MPLS) VPNs", by Rosen et al, March 1999. RFC 2547 describes a method where service providers may offer virtual private network (VPN) services using Multi-Protocol Label Switching (MPLS) for packet forwarding and Border Gateway Protocol (BGP) for route distribution. BGP/MPLS VPNs, because they operate at layer 3 of the network, will be referred to hereinafter as IP VPNs.

In the IP VPN architecture, a set of "sites" is attached to a common network which is referred to as a "backbone". A site is a set of IP systems or devices which are capable of communicating with each other without the use of the backbone. For example, a site may include a set of systems which are in geographic proximity. In some protocols, such as the Border Gateway Protocol, a site would also be referred to as an autonomous system (AS). One or more Customer Edge (CE) devices are included at each site to enable the site to communicate with the backbone. The Customer Edge device may also be referred to as a gateway device, as it provides the communication path between the attached site (or autonomous system) and the service provider site.

A backbone is a network owned and operated by one or more Service Providers (SPs). The owners of the sites are customers of the SPs. The SP's backbone includes one or more Provider Edge (PE) routers, in addition to other routers that may not attach to CE devices. According to the IP VPN architecture, two sites have IP connectivity over the backbone only if there is some VPN which includes them both. Each PE router maintains a separate forwarding table for each VPN. When a packet is received from a particular site, the forwarding table associated with the VPN that the site belongs to is consulted to determine how to route the packet. It is important to note that the PE router does not include forwarding information for any VPN that has no site connected through the PE.

Figure 1:
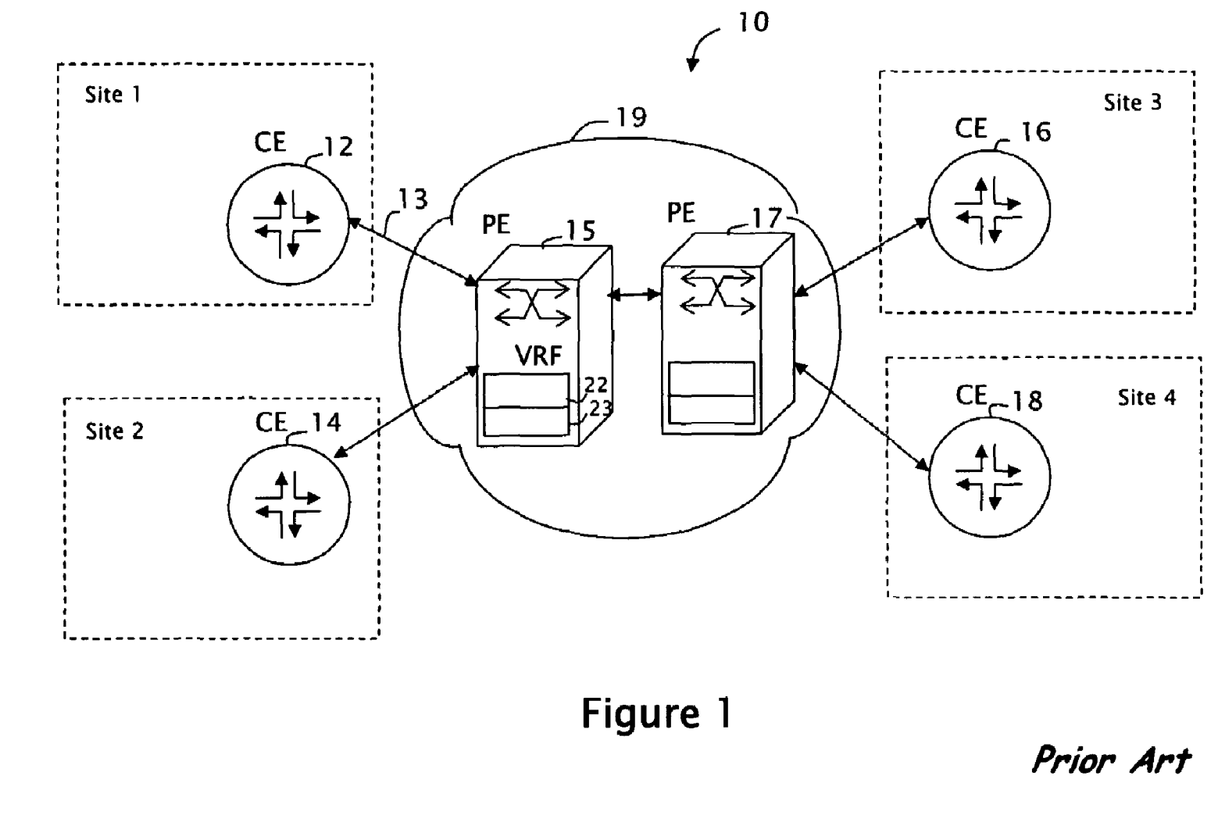
FIG. 1 is a block diagram of a layer 3 Virtual Private Network architecture.

Referring now to FIG. 1, an exemplary IP VPN network is illustrated. At each site, there is one or more Customer Edge (CE) device, each of which is attached via some sort of data link 13 (PPP, ATM, Ethernet, Frame Relay, etc.), to one or more Provider Edge (PE) routers. The IP VPN network 10 illustrated in FIG. 1, includes CE device 12 at site 1, CE device 14 at site 2, CE device 16 at site 3 and CE device 18 at site 4. The backbone 19 includes PE devices 15 and 17, which may be operated by one or more different service providers.

Each PE maintains a number of separate forwarding tables, such as Virtual Routing and Forwarding (VRF) table 22 and 23 in PE 15. Every site to which the PE is attached is mapped to one of the forwarding tables. When a packet is received from a particular site, the forwarding table associated with that site is consulted in order to determine how to route the packet. For example, forwarding table 22 associated with site 1 is populated only with routes that lead to other sites that have at least one VPN in common with site 1.

The advantage of the IP VPN structure of FIG. 1 is its scalability from the viewpoint of the client device. Because routing adjacencies are maintained between the PEs, and from the PEs to the CEs rather than just between the CEs (as with layer 3 VPNs) the impact of any change in the network topology can be easily addressed by updating the VRF of the impacted PEs, thereby drastically reducing the amount of routing traffic in the network associated with maintaining route databases at each site. The problem with the IP VPN structure is that it does nothing to remedy the scalability issues associated with providing security in the VPN. For example, it does not provide any data protection, i.e., confidentiality, message integrity, host authentication, replay protection etc. Rather, the IP VPNs rely on the fact that the PEs store forwarding information on a VPN specific basis, thereby ensuring that site information does not get forwarded to an incorrect destination.

The problem with such a scenario is that it requires that a high level of trust be placed on the Service Provider to protect the Customer data. Customers may be uncomfortable with the idea that their data may reside, unprotected, on the same data switch as that of a competitor, even if it is theoretically unavailable to the competitor. However, overlaying the traditional encrypted tunneling methods on top of the IP VPN structure simply introduces more point to point security associations, thereby eliminating the scalability benefits of the IP VPN architecture. Accordingly, it would be desirable to identify a method of further securing data in an IP VPN environment while maintaining the scalability attribute of the network.

SUMMARY OF THE INVENTION

According to one aspect of the invention, a scalable, secure network architecture includes a device, coupled to at least two members in a network. The device includes routing functionality and security association maintenance functionality. Each member of a group of two or more members that seeks secure communication registers with the device to obtain a Group Security Association (GSA). The GSA is used for all communication between members of the group, and thus can be used to secure communications for the group to provide a private network over a public backbone. Therefore each site needs store only the number of security associations corresponding to the number of secure groups of which it is a member, as opposed to the number of devices to which it is securely attached. Also there is no point to point management of the IPsec associations between the endpoints.

In addition, the device maintains routing information for each group, and uses aggregate route peering such as BGP route reflection techniques to provide routes to member sites within the group. In one embodiment, the distribution of routes to members of a group is secured using the security association corresponding to the group. Such an arrangement allows routes to be interpreted only by the members of the group. One advantage of the present invention is that it permits a scalable private network to be configured on top of an existing network transparently.

According to one embodiment of the invention a network is described. The network includes a group of interconnected autonomous systems and means for providing secure communications between at least two of the autonomous systems in the group. The means for providing secure communications between at least two of the autonomous systems includes means for assigning a security association to the group, wherein communications between members of the group are secured using the security association and means for reflecting routes to each of the autonomous systems in the group to other autonomous systems of the group, wherein the reflected routes are secured using the security association of the group.

According to another aspect of the invention, a method of securing communication between at least two members of a group, wherein each member is an autonomous system comprising one or more devices, is provided. The method includes the steps of forwarding, to at least one member of the group, a group security association corresponding to the group, receiving, from the at least one member of the group, route information enabling communication with each of the one or more devices of the autonomous system corresponding to the member, identifying at least one other member of the group and reflecting the route information received from each member of the group to the at least one other member of the group.

According to a further aspect of the invention, a method for communicating securely by one member of a group with at least one other member of the group over a backbone including the steps of receiving, at the one member, a group security association corresponding to the group, forwarding, by the one member to another coupled device, routing information for the one member, the routing information being secured using the group security association of the group.

DETAILED DESCRIPTION

Figure 2:
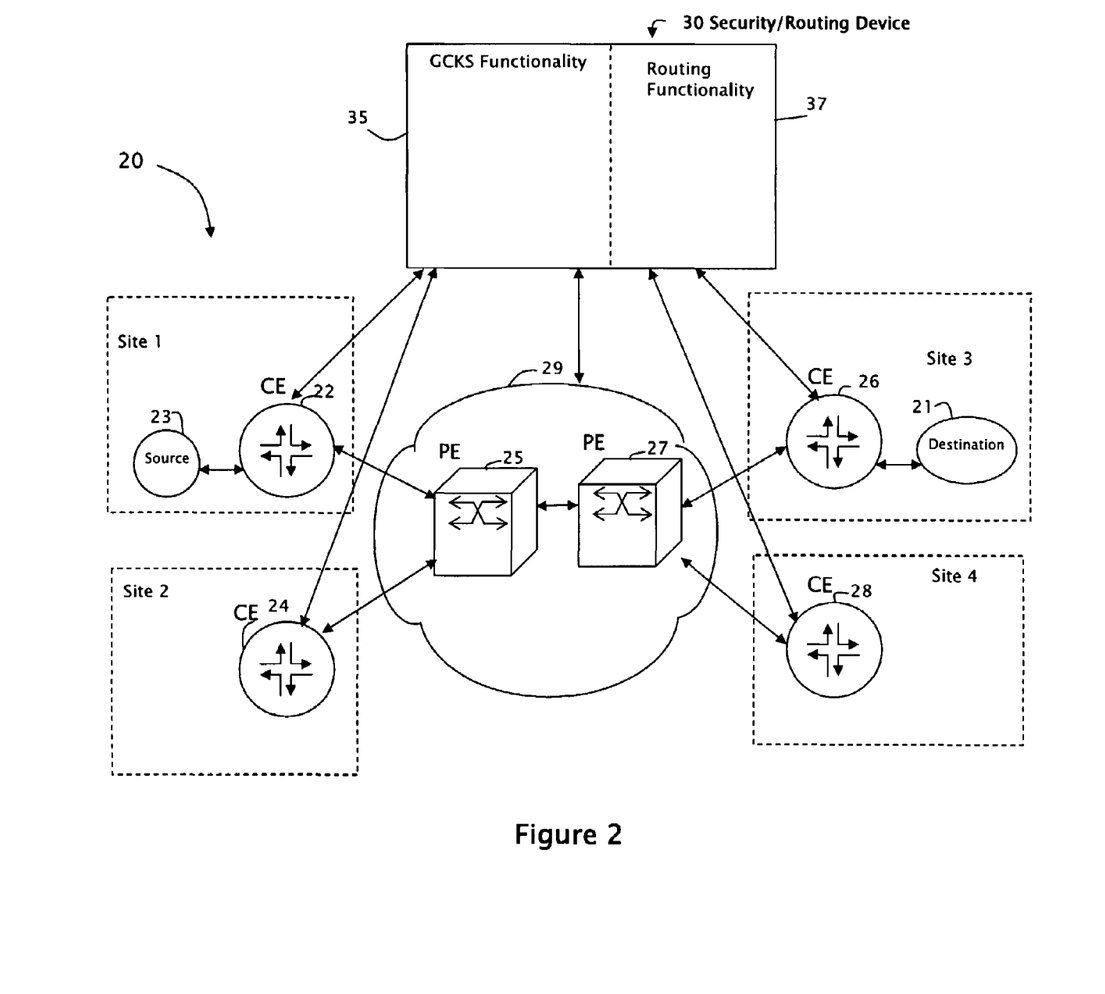
FIG. 2 is a block diagram of a scalable, self-configuring secure network architecture of the present invention.

A self-configuring, scalable secure architecture 20 is illustrated in FIG. 2. In FIG. 2, terminology that was introduced with regard to the IP VPN network of FIG. 1 will be used, but it will become evident that the present invention may be used in other network architectures (such as Virtual Routing type networks) and is therefore not limited to any particular IP network architecture.

In FIG. 2, a number of sites including Site1 having Customer Edge (CE) device 22, Site 2 comprising CE 24 Site 3 comprising CE 26 and Site 4 comprising CE 28, are shown coupled together for communication over a public network 29 which includes Provider Edge (PE) devices 25 and 27. The present invention provides a mechanism whereby the communications between members at sites may be secured over the public network. For example, communication between a source station 23 at Site 1 to a destination station 21 at Site 3 may be secured as it travels across public network 29. According to one embodiment, this may be achieved by adding a Security/Routing device 30 to the public network 29. The Security/Routing (S/R) device 30 includes both Global Controller/Key Server (GCKS) functionality 35 as well as Routing Functionality 37, each of which will be described in more detail below.

In the present invention, each station that is to be a member of a private network (or group) registers with the Security/Routing (S/R) device 30 and receives a Group Security Association (GSA) associated with the private network (or group). The GSAs are provided and maintained by the GCKS 35. A member registers with the GCKS with a group identifier. The member may register as part of a group by identifying the group and the other members. Alternatively, a member may register by identifying its group, and the Routing Functionality 37 auto-discovers the other members of the group. As the members are identified, or during the auto-discovery process, the Routing functionality reflects the routes of all members in the group to all other members of the group. In one embodiment, the forwarding of the routes to the respective group members is performed using a channel that is secured via the GSA associated with the group. When each member has received the routing information for other members of the group, it can forward communication directly to the group members, securing the communication using the group SA and standard encapsulation techniques (such as IPsec, GRE, MPLS, etc.). Thus the S/R device provides a mechanism for private networks to be built on top of an existing network without modification of any existing network components.

Figure 3:
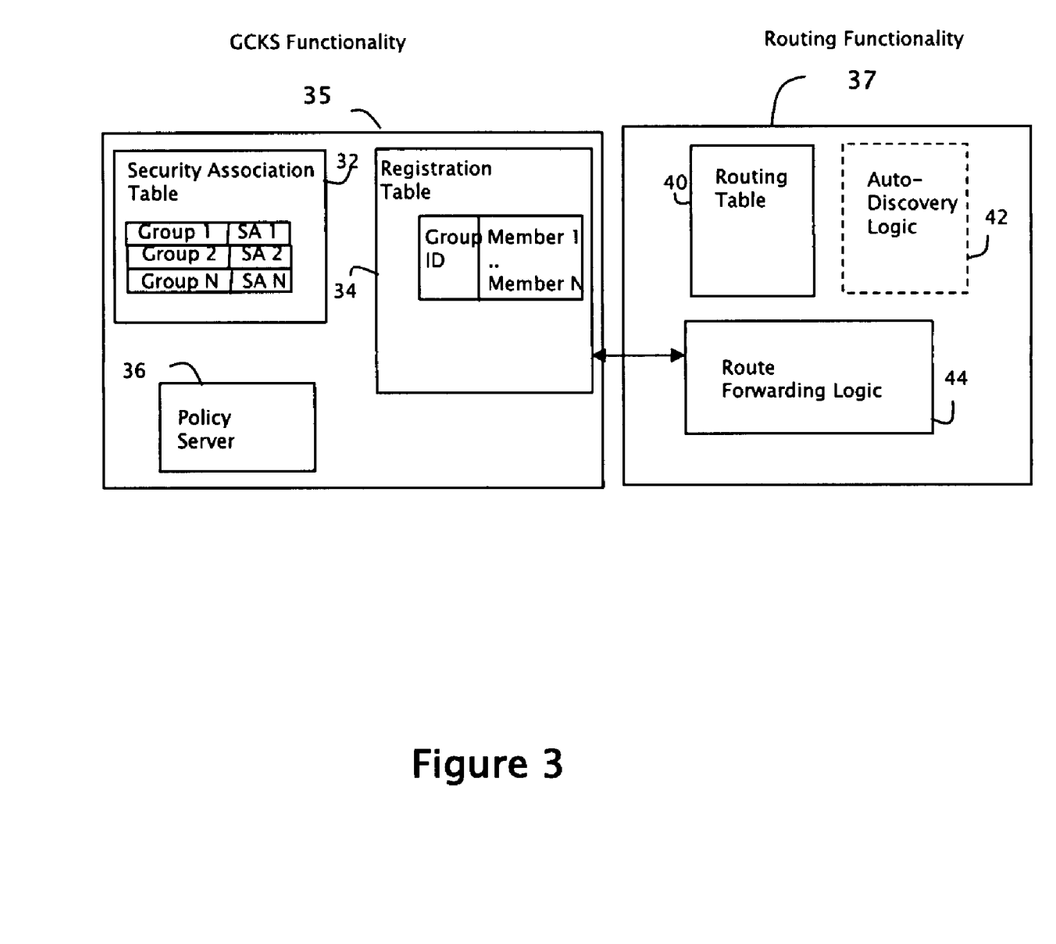
FIG. 3 is a more detailed block diagram of the Security/Routing device of the present invention.

Exemplary components of one embodiment of a Security/Routing device 30 are shown in FIG. 3. The components shown in FIG. 3 are meant to represent functional entities only, and alternative implementations, where certain functions are merged or isolated, are encompassed herein. The GCKS functionality 35 is shown to include a security association (SA) table 32, a registration table 34 and a policy server 36. Together, these components implement the group key management protocols for the network. Group key management protocols help to ensure that only members of a secure group can gain access to and authenticate group data. The main goal of group key management protocol is to securely provide the group members with an up to date Security Association (SA) containing the information needed to secure group communication. Generally speaking, a Security Association (SA) is a set of policy and cryptographic keys that provide security services to network traffic that matches that policy. A SA typically includes selectors, properties, cryptographic policy, and keys. The selectors include source and destination transport addresses. The properties include, for example, a security parameter index or cookie pair, and identities. Cryptographic policy includes the algorithms, modes, key lifetimes, and key lengths used for authentication or confidentiality. The keys include the authentication, encryption and signing keys. It should be noted that the present invention may utilize any type of SA, and thus should not be limited to only the SAs used below to describe the exemplary embodiments.

Group Security Associations (GSAs) are a bundling of SAs that together define how a group communicates securely. The GSA may include, for example, a registration SA, a rekey protocol SA, and one or more data security protocol SAs. A GSA includes all of the attributes identified above with regard to SAs, but also include several additional attributes. For example, GSAs have group policy attributes, such as the kind of signed credential needed for group membership, if group members will be given new keys when a member is added, or whether group members will be given new keys when a member is removed from the group. A GSA is comprised of multiple SAs, and these SAs may be used for independent purposes. For example, three types of SAs which are generally needed for group communication are Registrations SAs, allowing a group member to register with the GCKS, Re-Key SAs, allowing the GCKS to forward new keys to all group members, and Data Security SAs, which protect data between sending and receiving members of the group.

With regard to the particular functional components illustrated in FIG. 3, the SA table 32 stores one or more security associations (SAs) for each group, wherein the security associations identify the type of encryption, authentication, etc that is applied to communications between the group members. A registration table 34 includes an entry for each member that has registered with the GCKS, and group IDs for each group with which the member is associated. The data may be stored in any manner, and it is shown in FIG. 3 as having a list of members stored for each group identifier. The policy server 36 represents both the entity and functions used to create and manage security policies. Although the policy server is shown included as part of the GCKS 35, it may be a separate, network administrative entity. It serves to install and manage the security policies related to the membership of a given multicast group and those relating to keying material for a multicast group.

The GCKS is largely a standard defined entity, and more details on the operations and management of Group keys can be found in both "The Multicast Security Architecture", Internet Engineering Task Force (IETF) Draft, draft-iety-msec-arch-01.txt, by Hardjono et al of May 2003, and "Group Key Management Architecture", IETF MSEC WG, Internet Draft draft-ietf-msec-gkmarch-05.txt, by Baugher et al, both incorporated herein by reference. Both of the above documents describe implementation alternatives which may differ from those described herein, but are equally applicable to the present invention.

The routing functionality 37 is shown to include a routing table 40 and route forwarding logic 44. Auto-discovery logic 42 may be included in embodiments where members register as a part of a group and the other members are auto-discovered by the S/R 30. In one embodiment of the invention, a Border Gateway Protocol (BGP) is used as the routing protocol that is used on the public network, and thus route forwarding logic 44 operates according to the BGP protocol. BGP performs interdomain routing in Transmission-Control Protocol/Internet Protocol (TCP/IP) networks. BGP is an exterior gateway protocol (EGP), which means that it performs routing between multiple autonomous systems (AS) or domains and exchanges routing and reachability information with other BGP systems. The operating characteristics of the BGP protocol are described in Rekhter, Y. and T. Li, "A Border Gateway Protocol 4 (BGP-4)", RFC 1771, March 1995, incorporated herein by reference.

Certain characteristics of the BGP protocol are described below.

BGP-4, Routes: Advertisement and Storage:

For purposes of this protocol a route is defined as a unit of information that pairs a destination with the attributes of a path to that destination:

Routes are advertised between a pair of BGP speakers in UPDATE messages: The destination is the systems whose IP addresses are reported in the Network Layer Reachability Information (NLRI) field, and the path is the information reported in the path attributes fields of the same UPDATE message. Routes are stored in the Routing Information Bases (RIBs): namely, the Adj-RIBs-In, the Loc-RIB, and the Adj-RIBs-Out. Routes that will be advertised to other BGP speakers must be present in the Adj-RIB-Out; routes that will be used by the local BGP speaker must be present in the Loc-RIB, and the next hop for each of these routes must be present in the local BGP speaker's forwarding information base; and routes that are received from other BGP speakers are present in the Adj-RIBs-In. If a BGP speaker chooses to advertise the route, it may add to or modify the path attributes of the route before advertising it to a peer. BGP provides mechanisms by which a BGP speaker can inform its peer that a previously advertised route is no longer available for use. There are three methods by which a given BGP speaker can indicate that a route has been withdrawn from service: a) the IP prefix that expresses destinations for a previously advertised route can be advertised in the WITHDRAWN ROUTES field in the UPDATE message, thus marking the associated route as being no longer available for use b) a replacement route with the same Network Layer Reachability Information can be advertised, or c) the BGP speaker—BGP speaker connection can be closed, which implicitly removes from service all routes which the pair of speakers had advertised to each other.

The Routing Information Base (RIB) within a BGP speaker consists of three distinct parts: a) Adj-RIBs-In: The Adj-RIBs-In store routing information that has been learned from inbound UPDATE messages. Their contents represent routes that are available as an input to the Decision Process. b) Loc-RIB: The Loc-RIB contains the local routing information that the BGP speaker has selected by applying its local policies to the routing information contained in its Adj-RIBs-In. c) Adj-RIBs-Out: The Adj-RIBs-Out store the information that the local BGP speaker has selected for advertisement to its peers. The routing information stored in the Adj-RIBs-Out will be carried in the local BGP speaker's UPDATE messages and advertised to its peers. In summary, the Adj-RIBs-In contain unprocessed routing information that has been advertised to the local BGP speaker by its peers; the Loc-RIB contains the routes that have been selected by the local BGP speaker's Decision Process; and the Adj-RIBs-Out organize the routes for advertisement to specific peers by means of the local speaker's UPDATE messages. Although the conceptual model distinguishes between Adj-RIBs-In, Loc-RIB, and Adj-RIBs-Out, this neither implies nor requires that an implementation must maintain three separate copies of the routing information. The choice of implementation (for example, 3 copies of the information vs 1 copy with pointers) is not constrained by the protocol. BGP messages are sent over a reliable transport protocol connection. A message is processed only after it is entirely received. The maximum message size is 4096 octets. All implementations are required to support this maximum message size. The smallest message that may be sent consists of a BGP header without a data portion, or 19 octets. Each message has a fixed-size header comprised of Marker, a Length and a Type. There may or may not be a data portion following the header, depending on the message type. The Marker field is a 16-octet field that contains a value that the receiver of the message can predict. The Length is a 2-octet unsigned integer indicates the total length of the message, including the header, in octets. The Type field is a 1-octet unsigned integer indicates the type code of the message. The following type codes are defined, OPEN, UPDATE, NOTIFICATION, KEEPALIVE.

After a transport protocol connection is established, the first message sent by each side is an OPEN message. If the OPEN message is acceptable, a KEEPALIVE message confirming the OPEN is sent back. Once the OPEN is confirmed, UPDATE, KEEPALIVE, and NOTIFICATION messages may be exchanged.

UPDATE messages are used to transfer routing information between BGP peers. The information in the UPDATE packet can be used to construct a graph describing the relationships of the various Autonomous Systems. By applying rules to be discussed, routing information loops and some other anomalies may be detected and removed from inter-AS routing. An UPDATE message is used to advertise a single feasible route to a peer, or to withdraw multiple unfeasible routes from service. An UPDATE message may simultaneously advertise a feasible route and withdraw multiple unfeasible routes from service. The UPDATE message always includes the fixed-size BGP header, and can optionally include: Unfeasible Routes Length, indicating the total length of the Withdrawn Routes field in octets, Withdrawn Routes, comprising a variable length field that contains a list of IP address prefixes for the routes that are being withdrawn from service, Length indicating the length in bits of the IP address prefix, Prefix, containing IP address prefixes followed by enough trailing bits to make the end of the field fall on an octet boundary, Total Path Attribute Length indicating the total length of the Path Attributes field in octets and Path Attributes, (a variable length sequence of path attributes, with each attribute comprising a triple <attribute type, attribute length, attribute value>). Path attributes include an ORIGIN attribute, an AS_PATH attribute (composed of a sequence of AS Paths), a NEXT_HOP attribute that defines the IP address of the border router that should be used as the next hop to the destinations listed in the Network Layer Reachability field of the UPDATE message, a MULTI_EXIT_DISC attribute, which is a non-transitive attribute that is used by a BGP speaker's decision process to discriminate among multiple exit points to a neighboring autonomous system. In addition a LOCAL_PREF attribute may be used by a BGP speaker to inform other BGP speakers in its own autonomous system of the originating speaker's degree of preference for an advertised route.

The UPDATE message also include Network Reachability Information. Network Layer Reachability Information contains a list of IP address prefixes. Reachability information is encoded as one or more 2-tuples of the form <length, prefix>. Length indicates the length in bits of the IP address prefix. A length of zero indicates a prefix that matches all IP addresses (with prefix, itself, of zero octets). The Prefix field contains IP address prefixes followed by enough trailing bits to make the end of the field fall on an octet boundary. An UPDATE message can advertise at most one route, which may be described by several path attributes. All path attributes contained in a given UPDATE messages apply to the destinations carried in the Network Layer Reachability Information field of the UPDATE message.

Thus in general, BGP-4 systems form a transport protocol connection between one another. They exchange messages to open and confirm the connection parameters. The initial data flow is the entire BGP routing table. Incremental updates are sent as the routing tables change. KeepAlive messages are sent periodically to ensure the liveness of the connection. Thus BGP-4 may be used to convey net-reachability information between neighboring gateways, possibly in different autonomous systems, where an autonomous system is one or more devices that may be grouped logically or physically. In some embodiments, all devices within an AS are fully meshed, such that all external routing information is re-distributed to all other routers in the autonomous system. In an alternative embodiment, BGP route reflection techniques such as those described in "BGP Route Reflection, An Alternative to full mesh IBGP", IETF RFC 1966 by Bates et al, June 1996, incorporated herein by reference, may be used.

In general, route reflection allows one device, coupled to a number of group devices, to reflect routes from each of the devices in the group to other devices in the group. Route reflection therefore eliminates the need for each member of the group to directly communicate with other members of the group, thereby reducing scalability issues in the network. In the present invention, the S/R device 30 is the centralized device that ensures that each member of a group receives routing information to enable it to communicate with other members of the group. In this embodiment, it is assumed that each member is an autonomous system comprising one or more devices.

Figure 4:
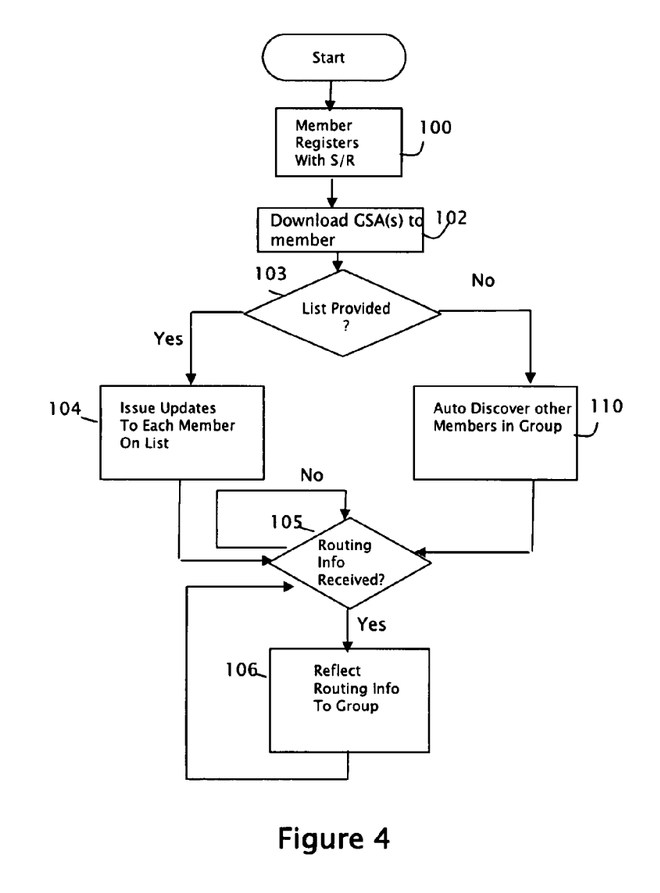
FIG. 4 is a flow diagram illustrating exemplary steps undertaken at the Security/Routing device of the present invention for reflecting routes to members of a secure group.

Referring now to FIG. 4, a flow diagram will now be used to describe the process of forwarding routes to each of the members in a group. At step 100, when a member registers with the S/R device 30, it includes forwards a registration request including routing information to enable communication to each one of the devices in the autonomous system. For example, a gateway device of an autonomous system may register with the S/R 30 advertising the local area networks that can be reached behind the gateway.

According to the BGP-4 protocol, routes are advertised between a pair of BGP speakers in UPDATE messages: The UPDATE messages include a Network Layer Reachability Information (NLRI) field, and a path attributes field. The destination of the UPDATE message is the systems whose IP addresses are reported in the Network Layer Reachability Information (NLRI) field, and the path is the information reported in the path attributes fields of the same UPDATE message. In the present invention, the S/R 30 is a BGP speaker to whom each of the members of the groups communicates to obtain routing information for other members of the group.

Next the S/R 30 obtains routing information for each of the members of the group. There are at least two methods that may be used by the S/R 30 to convey the routing information for each member to other members of the group; member identification and auto-discovery. In the member identification embodiment, each member may forward, along with their routing information, the identities of each of the other members in the group, wherein the identities may be in the form of a label, an IP address, or other identifier depending upon the protocol of the network 20. At step 103 it is determined whether a member list was provided for the group. If a member list was received, at step 104 for each member of the list, the route forwarding logic 44 issues UPDATE commands to receive routing information from the members, then proceeds to step 105.

At step 105 the route forwarding logic waits to receive route information. At step 106 when the route information is received the S/R reflects the route information to all other identified members of the group. As above, this route information is advantageously secured using the security association corresponding to the group. When all identified member routes have been reflected, the returns to step 105 to await additional route information updates that are sent periodically by the member devices to reflect changes in the network topology.

If, however, it is determined at step 103 that a list of members is not received, in an alternative embodiment BGP may be used to auto-discover other members of the group using mechanisms such as those described in IETF draft-ietf-13vpn-bgpvpn-auto-00.txt, entitled "Using BGP as an Auto-Discovery Mechanism for Provider-Provisioned VPNs", by Ould-Brahim et al, July 2003, incorporated herein by reference. In the Ould-Brahim embodiment, group identifier information associated with the NLRI of a member is encoded either as a specific attribute of the NLRI, as a part of the NLRI, or both. It should be understood that, although this embodiment describes the use of the NLRI field for BGP-4 protocol, this is for purposes of illustration only. Other embodiments, where the S/R issues any other type of message or groups of messages capable of indicating that it is seeking information regarding routes for members of a specific, indicated group may alternatively be used and are also taught herein, and the present invention is limited to no specific embodiment.

During Auto-Discovery at step 110, UPDATE messages are forwarded to each of the coupled devices, with the UPDATE message including the group identifier, and proceeds to step 105 to await receipt of route information. Other members within the group, receive the UPDATE message, and, if they are part of the indicated group, return route information to the S/R 30 for each of the devices in it's autonomous system. As above, when route information is received at the S/R, the S/R advantageously secures this information and forwards it to all other identified members of the group. The process then proceeds to step 105, to await new routing information.

When a group member has registered with the GCKS, and at least one other member has been identified, the group member may begin secure communication with the group. The secure communication may be achieved by applying the security association of corresponding to the group to the packet, (for example, encrypting the packet), and forwarding it to the reflected routing designation in IPsec tunnel mode.

Figure 5:
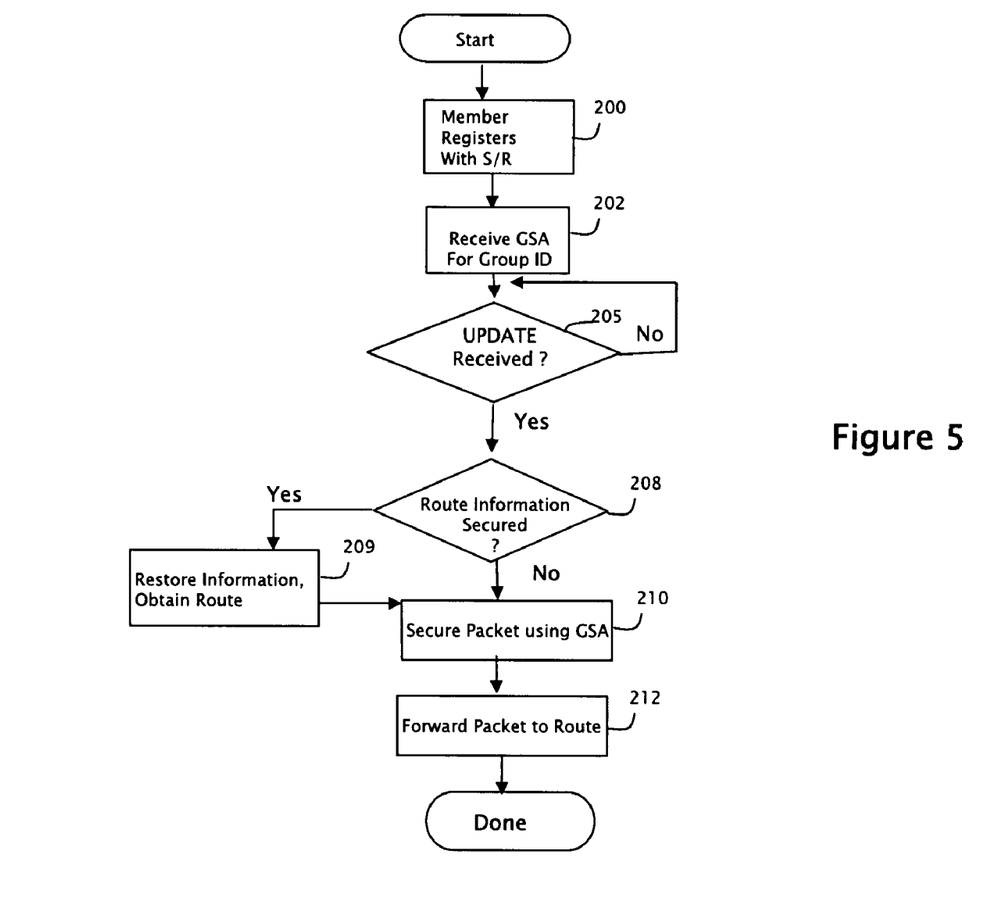
FIG. 5 is a flow diagram illustrating exemplary steps undertaken at a member of a group to set up a secure communication path with at least one other member of the group, using the Security/Routing device of the present invention.

Referring now to FIG. 5, a flow diagram illustrating the method of the present invention for enabling secure communication between members of a group is shown. At step 200, the member registers with the S/R 30, providing a group ID for a group associated with the member and optionally providing identifiers of other members in the group. At step 202, the member receives a GSA for the group ID. At step 204, the member forwards the route information, optionally encrypting the information using a GSA for the member, to the S/R 30 where the route information, optionally encrypted using the GSA, is distributed to the other members.

At step 206, the member receives routing information for at least one of the other members of the group. If it is determined at step 208 that the routing information is secured, at step 209 the member restores the routing information and obtains a route to the other member. At step 210, the member looks up the destination Gateway address for the destination and encrypts the packet using the GSA destined for the other member, and at step 212 forwards the packet to the other member using a secure format such as IPsec tunnel mode.

Having described one embodiment of the invention, it is understood that the various steps described above could be performed in different orders or combinations to achieve the same result. For example, although the process described in FIG. 5 illustrates that the key is downloaded to the member prior to the auto-discovery of the other members, alternative embodiments are envisioned wherein auto-discovery is performed within the key download process (such that members receive their SAs and routes at the same time). In addition, although the apparatus has been shown to include certain functional blocks, it is understood that these functions may be implemented in hardware, software, or a combination thereof. Also, the functionality may be implemented in one or many devices. The S/R functionality may be provided as a separate box that is plugged into an existing network, or may be provided as software that is layered on an existing device that is provided in a network. The resultant ability to provide secure group communication may be overlaid on top of any architecture, and is not limited to any particular architecture due to the protocols or commands recited above as examples.

Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g. microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in a memory device, such as semiconductor, magnetic, optical or other memory devices, and may be transmitted using any communications technology, such as optical, infrared, microwave, or other transmissions technologies.

Having described various embodiments of the invention, it is understood that the present invention should not be limited to any specific disclosure herein, but rather is embodied in the spirit and scope of the claims attached hereto.

The invention claimed is:

1. A method of securing communication between at least two members of a group, wherein each member is an autonomous system comprising one or more network devices, the method including the steps of:

for a first communication between a first subset of members, forwarding, to at least one member of the group, a group security association corresponding to the group;

receiving, from the at least one member of the group, route information enabling communication with each of the one or more network devices of the autonomous system corresponding to the member, the route information identifying a border router that should be used as the next hop to the at least one member of the group;

identifying at least one other member of the group; and reflecting the route information received from the at least one member of the group to the at least one other member of the group, including the step of securing the route information using the group security association, and for a second communication between a second subset of members, securing route information using the same group security association used for the first communication between the first subset of members.

2. The method according to claim 1, further comprising the step of receiving a registration request from the at least one member of the group.

3. The method according to claim 2 wherein the registration request includes a list including the at least one other member of the group.

4. The method according to claim 3, wherein the step of identifying the at least one other member includes the step of forwarding a request for routing information to the at least one other member, the request including an identifier for the group.

5. The method according to claim 3, wherein the step of identifying includes the step of auto-discovering the at least one other member of the group in response to the registration request by issuing a request for routing information to other devices in the network, the request for routing information including an identifier for the group.

6. Apparatus for providing secure communications between at least two members of a group over a backbone network comprising:

a network device including:

security association logic for forwarding a group security association of the group to the at least two members of the group for a first communication between a first subset of members;

route reflection logic for identifying at least one of the at least two members of the group, receiving routing information for the at least one of the two members of the group, the route information identifying a border router that should be used as the next hop to the at least one member of the group, securing the routing information for the at least one of the two members of the group using the group security association and for forwarding the secured routing information to another one of the at least two members of the group; and the security association logic and router reflection logic performing the same functions for a second communication between a second subset of members, including using the same group security association.

7. The apparatus of claim 6 wherein the logic for identifying at least one of the two members of the group is auto-discovery logic.

8. The apparatus of claim 6 wherein the logic for identifying at least one of the two members of the group includes a list of members of the group.

9. A method for communicating securely by one member of a group of network devices with at least one other member of the group of network devices over a network backbone including the steps of:

for a first communication between a first subset of members, receiving, at the one member, a group security association corresponding to the group; and forwarding, by the one member to the at least one other member of the group, routing information for the one member, the route information identifying a border router that should be used as the next hop to the one member of the group, the routing information being secured using the group security association of the group, and for a second communication between a second subset of members, the one member using the same group security association used for the first communication between the first subset of members.

10. The method of claim 9 further including the steps of:

receiving, at the one member, routing information associated with the at least one other member of the group, wherein the routing information associated with the at least one other member of the group is secured using the group security association of the group.

11. The method of claim 10 further comprising the steps of:

restoring the routing information associated with the at least one other member of the group using the group security association of the group;

securing a packet for transmission to the at least one other member of the group using the group security association to provide a secured packet; and forwarding the secured packet to the at least one other member using the restored routing information.

12. The method of claim 11 wherein the step of forwarding includes building a tunnel to the at least one other member of the group using the restored routing information and the group security association.

* * * * *